(12) United States Patent
Bambenek et al.

(10) Patent No.: US 8,903,605 B2
(45) Date of Patent: *Dec. 2, 2014

(54) SYSTEM TO REMOTELY UNLATCH A PICKUP BOX TAILGATE

(71) Applicant: Ford Global Technologies, LLC, Dearborn, MI (US)

(72) Inventors: Charles Gregory Bambenek, Northville, MI (US); Bhupendra A. Patel, Canton, MI (US); David Manuel Rogers, Southfield, MI (US); Thomas M. Herline, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/954,380

(22) Filed: Jul. 30, 2013

(65) Prior Publication Data

US 2014/0136021 A1     May 15, 2014

Related U.S. Application Data

(63) Continuation-in-part of application No. 13/674,502, filed on Nov. 12, 2012, now Pat. No. 8,532,873.

(51) Int. Cl.
*G06F 7/00* (2006.01)
*G07C 5/00* (2006.01)
*E05F 15/18* (2006.01)
*E05F 15/20* (2006.01)
*B62D 33/027* (2006.01)

(52) U.S. Cl.
CPC ............... *G07C 5/008* (2013.01); *E05F 15/18* (2013.01); *E05F 15/2076* (2013.01); *B62D 33/0273* (2013.01); *G06F 7/00* (2013.01)
USPC ...... 701/36; 296/26.1; 296/26.04; 296/26.07; 296/26.08; 296/26.09; 16/308; 340/687

(58) Field of Classification Search
CPC ............... B62D 33/0273; B62D 33/03; E05Y 2900/516; E05Y 2900/544; E05F 1/1238
USPC ............. 701/36, 306; 296/26.1, 26.04, 26.08, 296/26.07, 26.09, 26.11, 50, 56, 61, 62, 296/57.1, 98, 100.1, 100.04, 100.06, 296/100.07, 100.08, 100.17, 180.1; 16/308; 340/687
See application file for complete search history.

(56) References Cited

U.S. PATENT DOCUMENTS

| | | | |
|---|---|---|---|
| 6,769,729 B1 | 8/2004 | Bruford et al. | |
| 6,793,263 B1 | 9/2004 | Bruford et al. | |
| 6,874,837 B2 | 4/2005 | Bruford et al. | |
| 7,243,973 B2 * | 7/2007 | Plett et al. | 296/57.1 |
| 7,281,748 B2 * | 10/2007 | Ruhlander et al. | 296/57.1 |
| 7,547,055 B2 | 6/2009 | Stratten | |
| 7,551,958 B2 | 6/2009 | Libbus et al. | |
| 7,637,552 B2 * | 12/2009 | Ruhlander et al. | 296/57.1 |
| 8,201,869 B1 * | 6/2012 | Butlin et al. | 296/57.1 |
| 8,702,739 B2 * | 4/2014 | Batten et al. | 606/180 |

* cited by examiner

*Primary Examiner* — McDieunel Marc
(74) *Attorney, Agent, or Firm* — Raymond Coppiellie; Price Heneveld LLP

(57) ABSTRACT

A pickup truck includes a tailgate that is movable between open and closed positions. A powered latch provides for remote release of the latches of the tailgate. The tailgate is biased from the closed position towards the open position such that release of the latch causes the tailgate to shift automatically from the closed position to the open position.

20 Claims, 10 Drawing Sheets

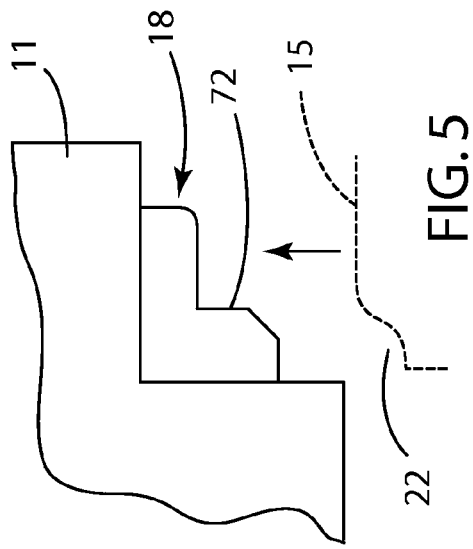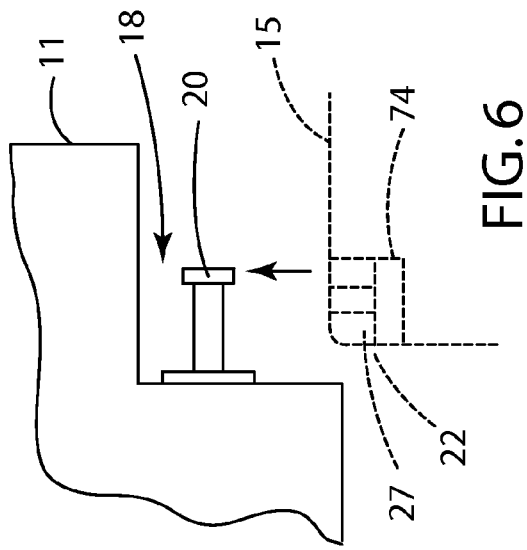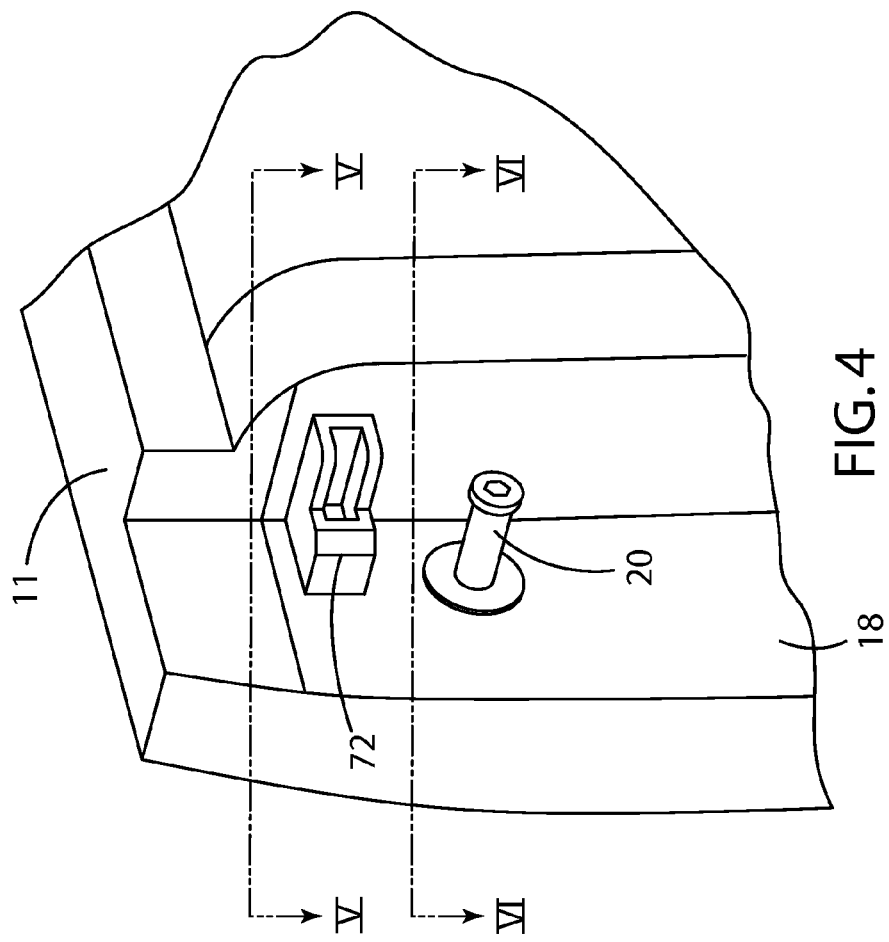

SYSTEM TO REMOTELY UNLATCH A PICKUP BOX TAILGATE

CROSS-REFERENCE TO RELATED APPLICATIONS

This application is a continuation-in-part of U.S. Pat. No. 8,532,873, issued Sep. 10, 2013 and entitled "SYSTEM TO REMOTELY UNLATCH A PICKUP BOX TAILGATE," the entire disclosure of which is incorporated herein by reference.

FIELD OF THE INVENTION

The present invention relates to a latch release for tailgates of pickup trucks and specifically to a remote unlatch arrangement for tailgates of pickup trucks.

BACKGROUND OF THE INVENTION

Pickup trucks typically include a latching tailgate that swings between an upright closed/latched position to a horizontal open position to selectively provide access to the truck box. Known latch arrangements may include strikers that are mounted to the vehicle structure, and extend inwardly from the vertically extending rear edges of the sidewalls of the truck bed. The strikers engage latches in the tailgate when the tailgate is in a closed position to thereby retain the tailgate in the closed position. A handle on the tailgate can be pulled to an open position to thereby unlatch the tailgate, permitting the tailgate to be pulled open manually by a user.

SUMMARY OF THE INVENTION

One aspect of the present invention is a tailgate for a pickup truck. The tailgate is configured to be movably mounted to a vehicle structure for movement between an upright closed position and an open position. The tailgate also includes first and second latches adapted to retain the tailgate in the closed potion when the first and second latches are latched. The tailgate may include a resilient member that interacts with the tailgate and biases the tailgate towards the open position when the tailgate is in the closed position and the latches are latched. The tailgate also includes at least one powered actuator operably connected to the first and second latches to selectively unlatch the first and second latches. The tailgate automatically shifts from an upright closed position to an open position upon actuation of the powered actuator. The powered actuator may be actuated by a remote switch, wireless key fob, or other such device.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is an isometric view of a portion of a pickup truck structure showing a resilient stop and a striker;

FIG. 5 is a cross sectional view of the resilient stop of FIG. 4 taken along the line V-V;

FIG. 6 is a cross sectional view of the striker of FIG. 4 taken along the line VI-VI;

FIG. 1;

DETAILED DESCRIPTION OF THE PREFERRED EMBODIMENTS

Figure 1:
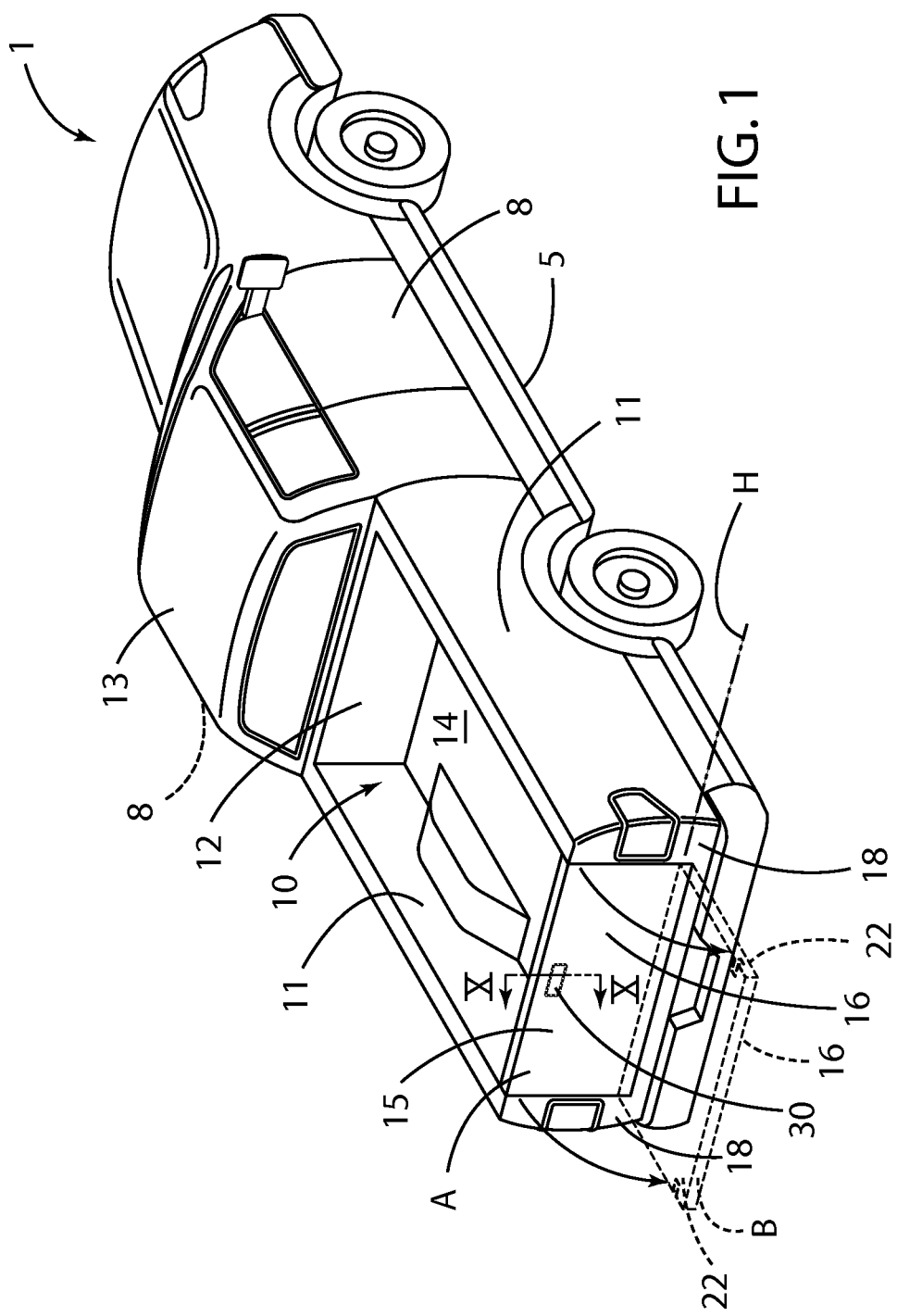
FIG. 1 is an isometric view of a pickup truck having a tailgate and powered latch according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A pickup truck 1 includes a vehicle structure 5, a bed or box 10, and a tailgate 15 that selectively closes off opening 16 of box 10. The box 10 is defined by upright sidewalls 11, a front side surface 12 formed by a truck cab 13, and an upwardly facing bed or box surface 14.

Figure 2:
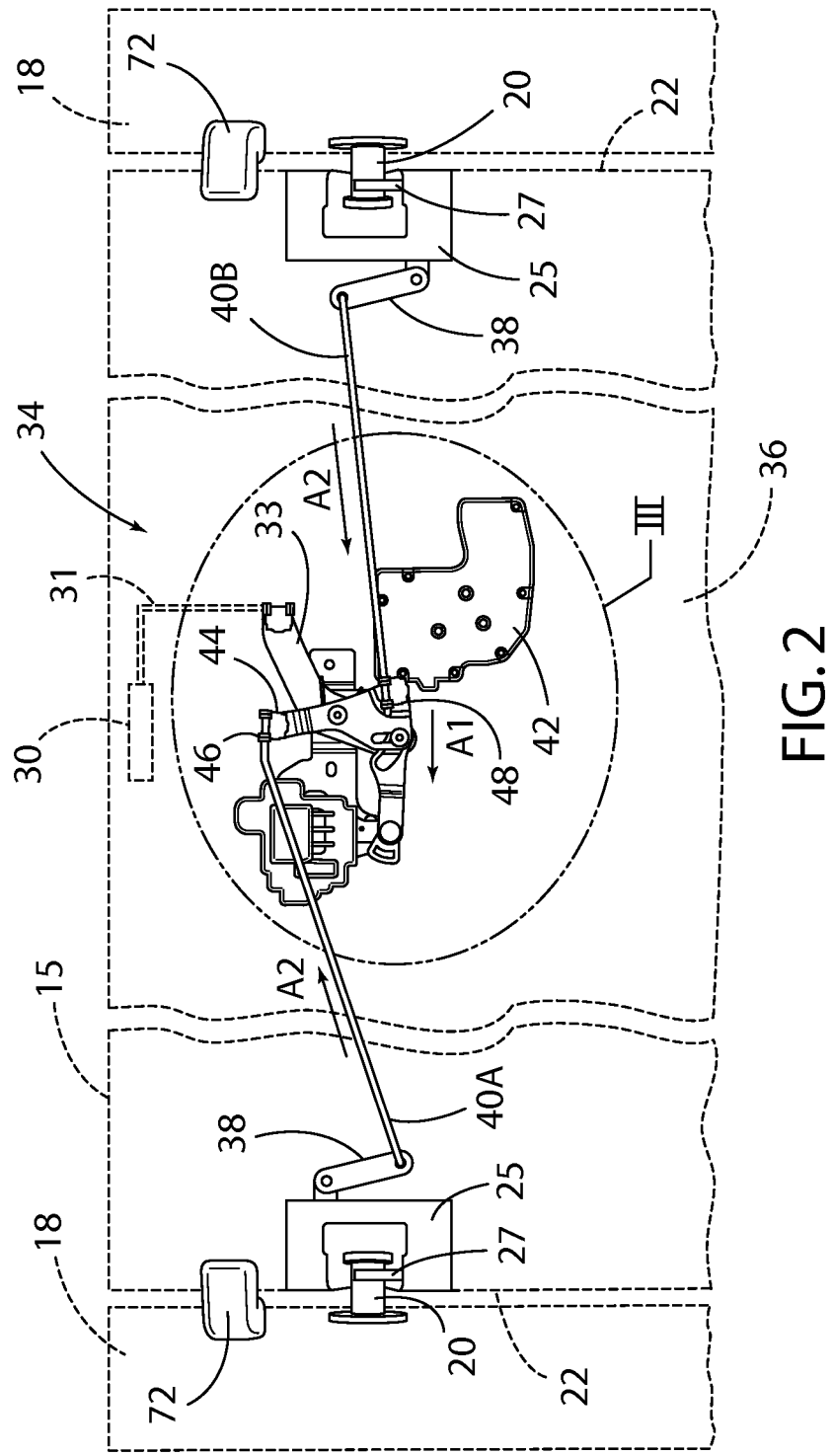
FIG. 2 is a partially fragmentary view of a tailgate and powered latch release according to the present invention.

The sidewalls 11 include upwardly extending rear edge portions 18 that interface with tailgate 15 when the tailgate 15 is in an upright, closed position "A." The tailgate 15 is rotatably mounted to the structure 5 for rotation about a generally horizontal axis "H." The tailgate 15 can be moved to a lowered, open position "B." Movement of tailgate 15 from position A to position B may be controlled by a suitable damper mechanism. The damper mechanism generates a force that slows rotational movement of tailgate 15 about axis H as it opens. An example of a damper is disclosed in U.S. Pat. No. 7,547,055, the entire contents of which are incorporated by reference. Damper mechanisms as disclosed in U.S. Pat. Nos. 6,874,837, 6,793,263, 6,769,729, and 7,551,958 may also be utilized to control opening of tailgate 15. With further reference to FIG. 2, a pair of strikers or pins 20 (see also FIGS. 4 and 6) extend inwardly from the rear edge portions 18 of sidewalls 11 towards opposite side edges 22 of tailgate 15. Latch mechanisms 25 include movable ratchet or latch members 27 that are mounted in a fishmouth opening 28 (see also FIG. 7) in a side edge 22 of tailgate 15. The movable latch members 27 releasably engage the strikers 20 when the movable latch members 27 are in a latched position, and the tailgate 15 is in the closed position A (FIG. 1). Latch mechanisms 25 may include movable pawls (not shown) that selectively retain the latch members 27 in their latched positions when the latch mechanisms 25 are latched. When latch mechanisms 25 are unlatched, the pawls are shifted to permit rotation of movable latch members 27 from latched positions to released positions. Latch members 27 may be spring-biased towards the released or open position such that latch members 27 automatically rotate to the open position when latch mechanisms 25 are unlatched. Alternatively, latch members 27 may be biased towards the latched position a spring or the like. The basic construction and operation of latch mechanisms 25 may be substantially similar to known latch mechanisms utilized in commercially available pickup trucks, such that a detailed discussion of latch mechanisms 25 is not believed to be required.

A handle 30 is movably mounted to the tailgate 15. In use, a user can manually open tailgate 15 by pulling on handle 30 to release latch mechanisms 25. Release of latch mechanisms 25 permits movement of latch members 27 from their latched positions to their unlatched positions. Thus, if a sufficient force is applied to tailgate 15 when latch mechanisms 25 are released, strikers 20 will cause latch members 27 to rotate open as tailgate 15 is opened. This permits the tailgate 15 to be moved from the closed position A to the open position B.

With reference to FIG. 2, a "brain plate" mechanism 34 is mounted to a central portion 36 of tailgate 15. Brain plate mechanism 34 provides for release of latch mechanisms 25 if handle 30 is actuated manually by a user, and also provides for release of latch mechanisms 25 if powered actuator 42 is remotely actuated by use of a key fob, a switch inside cab 13, or other such remote device. Latch mechanisms 25 include latch release levers 38 that connect to first and second elongated connecting members or rods 40A and 40B, respectively. A powered actuator 42 (see also FIG. 3) acts on a lever 44 having an upper end 46 and a lower end 48. Upper end 46 of lever 44 is connected to first rod 40A, and lower end 48 of lever 44 is connected to second rod 40B. Actuation of powered actuator 42 causes lever 44 to rotate in a clockwise direction (FIGS. 2 and 3) about a pin or pivot 50, pulling rods 40A and 40B inwardly in the directions of the arrows "A2" (FIG. 2). Inward movement of rods 40A and 40B rotates latch release levers 38 to release latch mechanisms 25 to permit rotation of latch members 27 from their closed positions to their open positions.

Figure 3:
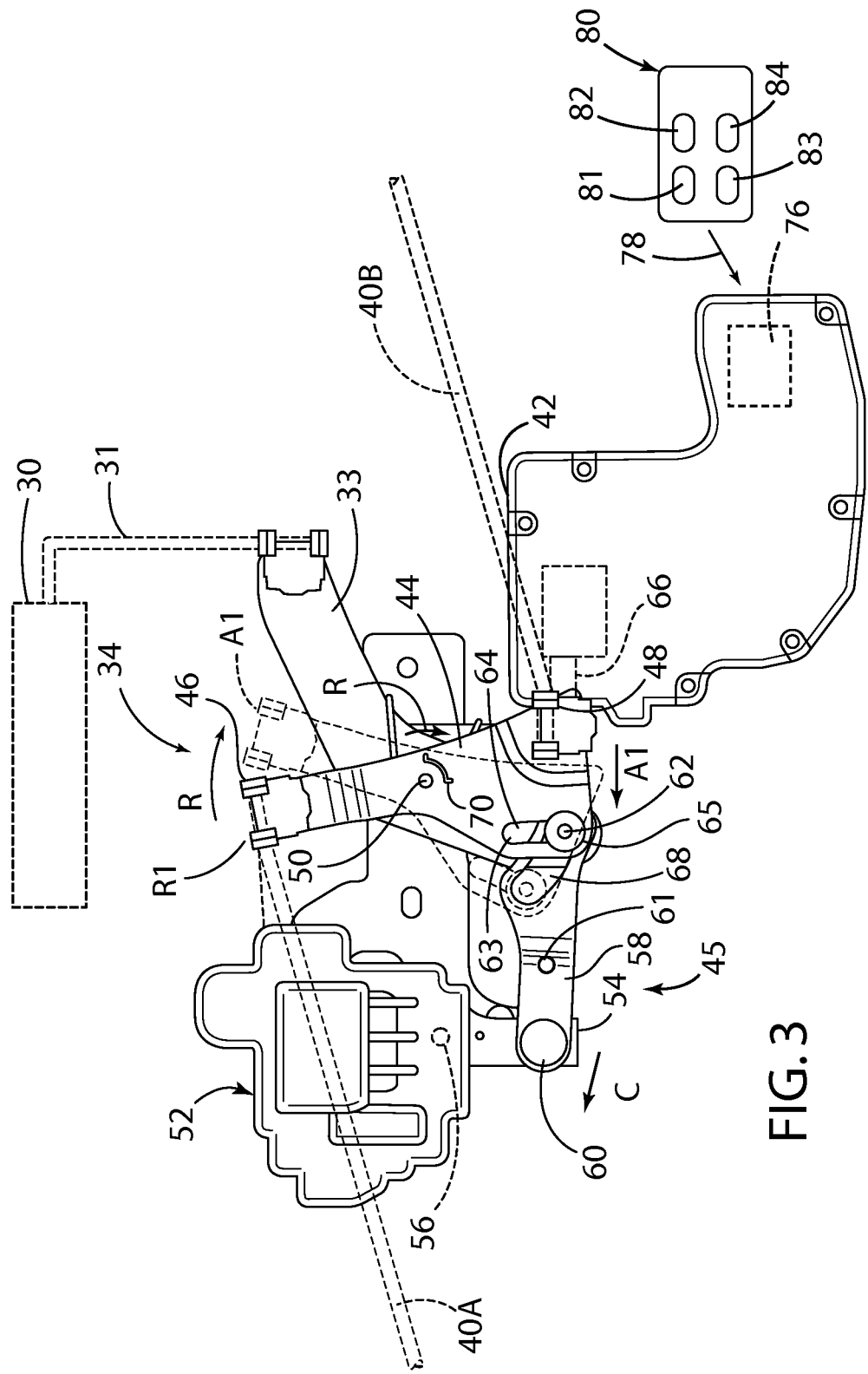
FIG. 3 is an enlarged view of a portion of the powered latch of FIG. 2.

A manual input lever 33 is operably connected to handle 30 by rod 31, such that operation of handle 30 shifts rod 31 downwardly causing manual release lever 33 to rotate in a clockwise direction (FIG. 3). This motion causes lever 44 to rotate about pin 50 in a clockwise direction as shown by the arrow "R," thereby releasing the latch mechanisms 25. Powered actuator 42 may be configured to push on lever 44 utilizing a rod 66 that is only capable of pushing, but not pulling, on lever 44. Rod 66 provides a "one way" push device that is capable of pushing/rotating lever 44 in a release direction R. However, rod 66 does not prevent rotation of lever 44 in the release direction R when handle 30 is manually actuated.

The system may include a powered lock arrangement that includes a powered locking actuator 52 (FIG. 3). Powered actuator 52 has an output pin 54 that moves downwardly in a linear manner upon actuation of actuator 52. A lever 58 is pivotably mounted to a pin 61. Pin 54 pushes down on lever 58 such that lever 58 rotates about pin 61, causing a pin 62 to move to an upper end 63 of slot 64. When pin 62 is at the upper end 63 of slot 64, the mechanism is in a locked position wherein the release lever 33 is decoupled from the lever 44. When decoupled, lever 44 does not rotate with lever 33 when handle 30 is actuated. Thus, in the locked condition, actuation of handle 30 does not result in unlatching of latches 25. However, when the levers 33 and 34 are coupled (i.e. pin 62 is located at a lower end of 65 of slot 64), actuation of handle 30 rotates lever 33 causing lever 44 to rotate to release latches 25 to open the tailgate 15.

Figure 10:
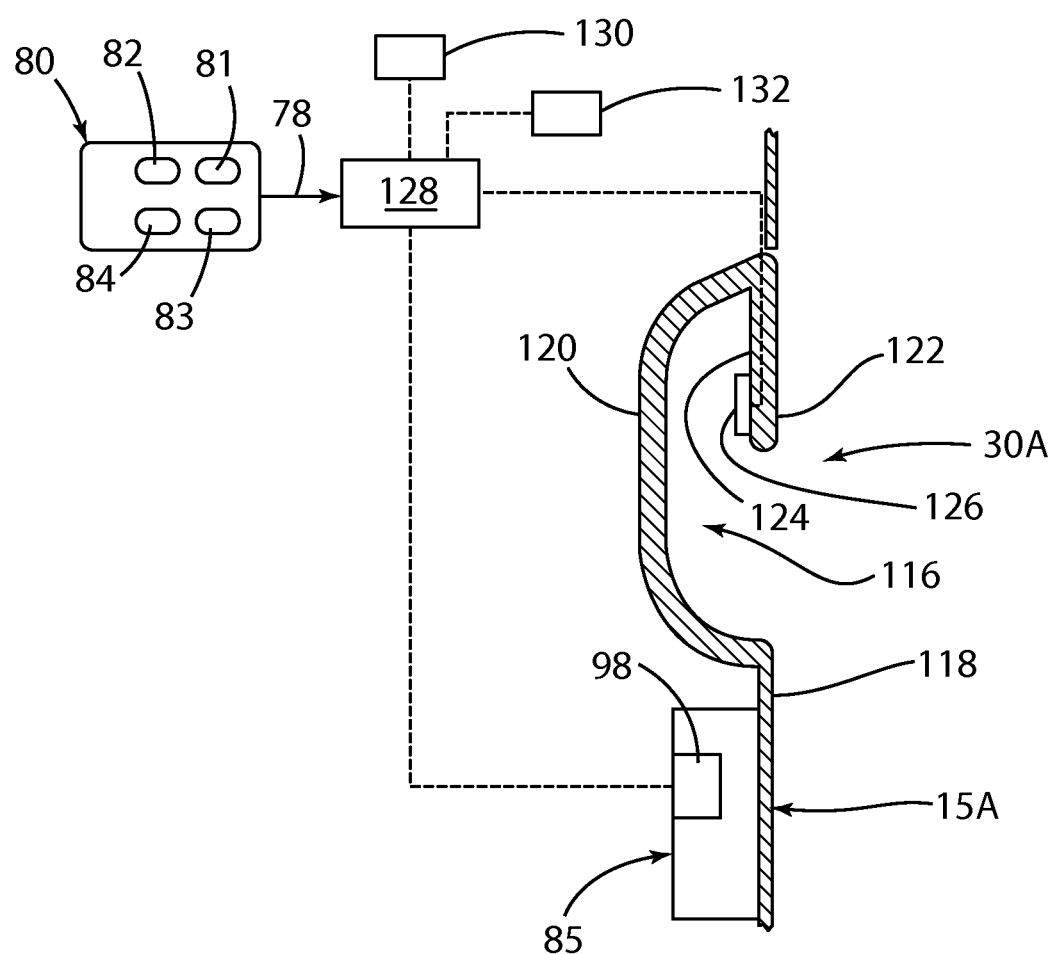
FIG. 10 is a cross-sectional view of a tailgate handle according to another aspect of the present invention taken along the line X-X.

Powered actuator 52 may include a receiver that receives a signal 78 from key fob 80 (FIG. 3) to actuate powered actuator 52 to unlock/lock the latches 25. Key fob 80 may include one or more buttons 81-84 that are operably connected to a transmitter (not shown) in key fob 80 to provide various functions. As discussed in more detail below, buttons 81 and 82 may comprise lock and unlock buttons, respectively, that remotely actuate actuator 52 and/or powered door locks (not shown) of doors 8 utilizing a transmitter in key fob 80, and receivers (of a known type) that are operably connected to doors 8 and/or actuators 42 and 52, and/or a vehicle controller such as controller 128 (FIG. 10). Button 83 may comprise an unlatch button that remotely actuates powered actuator 42 to unlatch latch mechanisms 25. Button 84 may comprise a conventional "panic" (alarm actuation) button.

A torsion spring 70 biases lever 44 in a direction opposite the release direction R, such that release lever 44 returns to the rest or home position R1 upon release of handle 30, or retraction of rod 66 of powered actuator 42. Powered actuator 42 may comprise an electric motor, gears, solenoid, or other device having a linearly movable output member that operably engages lever 44 to provide for powered release of latch mechanisms 25.

With further reference to FIGS. 4 and 5, a resilient bumper or pad member 72 is mounted to the rear edge portion 18 of sidewalls 11 of truck 1. When the tailgate 15 is shifted to a closed position, movable latch members 27 engage strikers 20 and rotate to their closed positions, and the edge portions 22 of tailgate 15 tightly abut resilient bumper 72 in an interference fit. This interference fit generates a force acting on tailgate 15 tending to shift the tailgate 15 from a fully closed position A (FIG. 1) to an open position B.

Figure 7:
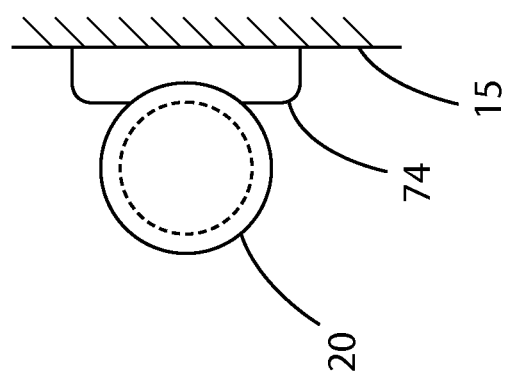
FIG. 7 is an isometric view of a portion of a side edge of a tailgate showing a latch disposed in a fishmouth opening.
Figure 8:
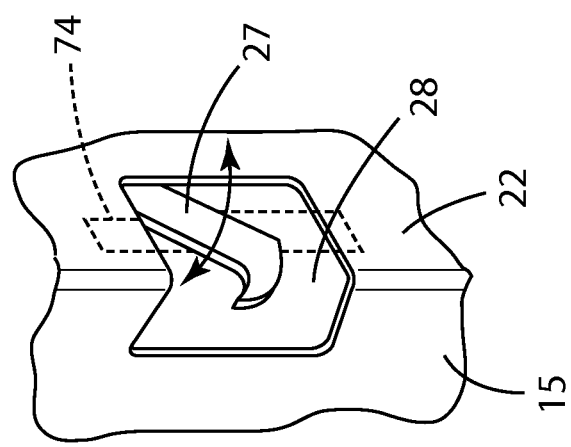
FIG. 8 is a partially fragmentary view of a striker engaging a resilient pad to bias the tailgate from the closed position towards the open position.

With further reference to FIGS. 6 and 7, tailgate latch mechanisms 25 include resilient members 74 that are mounted directly adjacent the movable latch members 27 inside fishmouth openings 28. With reference to FIG. 8, resilient pads 74 deformably contact strikers 20 when tailgate 15 is in a fully closed position A. This contact between striker 20 and resilient member 74 forms an interference fit generating a force tending to shift the tailgate 15 from the fully closed position A (FIG. 1) to the open position B.

In use, to remotely unlatch tailgate 15, an operator generates a signal to the powered actuator 42 utilizing a manually actuated unlatch switch (e.g. switch 130, FIG. 10) mounted in the vehicle's interior, or unlatch a button/switch such as unlatch button 83 of remote key fob 80. In order to prevent inadvertent opening of tailgate 15, the powered actuator 42 may be configured to require that unlatch button 83 and/or a switch inside the vehicle is actuated two times within a predefined time interval (e.g. 1 or 2 seconds) in order to actuate powered actuator 42. The powered actuator 42 may include a receiver 76 (FIG. 3) that receives a signal 78 from key fob 80 upon actuation of unlatch button 83 on key fob 80. Alternately, a controller (e.g. controller 128; FIG. 10) may be operably connected to a receiver that receives signals from key fob 80. The powered actuator 42 is then actuated, and rod or actuation device 66 pushes on lever 44, thereby rotating lever 44 in the direction of the arrow R (FIG. 3), thereby shifting elongated connecting members 40A to 40B to thereby release latch mechanisms 25. As discussed above, when latch mechanisms 25 are released, strikers 20 cause rotation of latch members 27 as tailgate 15 moves towards the open position. The resilient bumper 72 and resilient member 74 together generate a force on tailgate 15 tending to open the tailgate 15. Upon release of the latch mechanisms 25, the door automatically swings from the closed position A to the open position B due to the forces generated by the resilient bumper 72 and/or resilient member 74, and also due to gravitational forces tending to rotate the tailgate 15 towards the open position B about a horizontal pivot axis H.

It will be understood that actuation of powered actuator 42 causes rotation of lever 44 and unlatched of latches 25 regardless of whether or not actuator 52 has been actuated to unlock the tailgate by decoupling lever 30. Thus, remote unlatching/opening of tailgate 15 by actuation of a switch inside the vehicle or button 83 on key fob 80 does not require unlocking tailgate 15. However, unlatching tailgate 15 utilizing lever 30 requires actuation of lock actuator 52 by actuation of an unlock switch inside the vehicle (e.g. switch 132; FIG. 10) or pushing unlock button 82 of remote key fob 80. Also, the mechanism 34 may be utilized without actuator 42. In this configuration, actuator 52 provides a remote lock/unlock feature, but unlatching of tailgate 15 must be done manually by actuation of lever 30.

Figure 9:
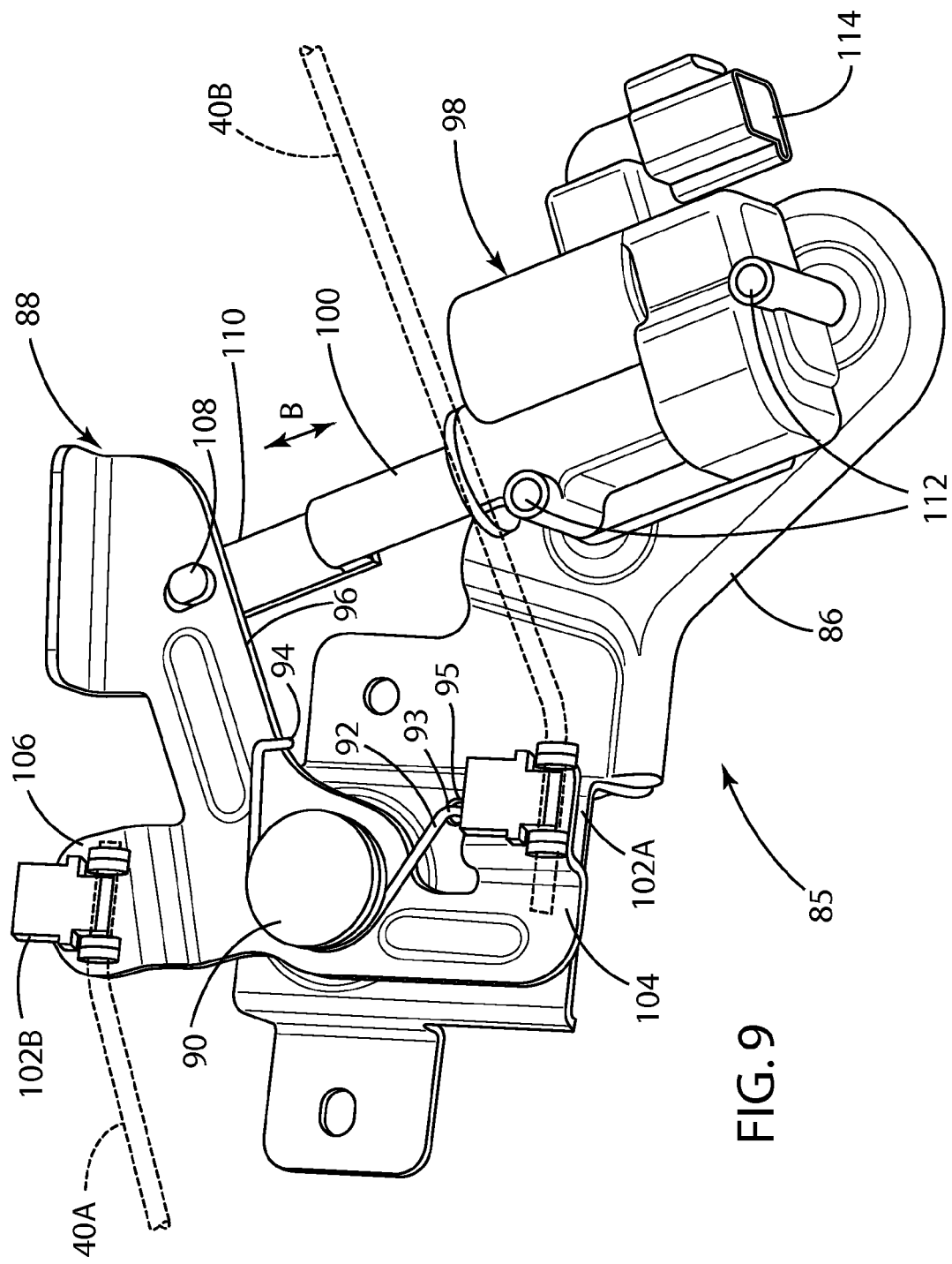
FIG. 9 is an enlarged view of a powered latch release according to another aspect of the present invention.

With further reference to FIG. 9, a powered latch release mechanism 85 according to another aspect of the present invention includes a base structure 86 that may be rigidly secured to tailgate 15 in substantially the same location as mechanism 34 as shown in FIG. 3. However, unlock mechanism 34, the latch release mechanism 85 is utilized in connection with a handle 10A (FIG. 10) having an electrically operated unlatch switch 126 rather than manual release lever 30. Also, mechanism 85 does not include a lock actuator 52. Rather, the lock state of mechanism 85 is stored in the memory of a controller 128 as discussed in more detail below in connection with FIG. 10.

Referring again to FIG. 9, mechanism 85 includes a lever 88 that is rotatably mounted to base structure 86 by a pin or shaft 90. A torsion spring 92 includes a first end 93 that is received in an opening 95 of base structure 86. A second end 94 of torsion spring 92 contacts edge surface 96 of lever 88 to thereby rotationally bias lever 88 in a counterclockwise direction.

A powered actuator 98 includes an output member 100 that shifts linearly in the direction of the arrow "B." Powered actuator 98 is connected to base structure 86 by mechanical fasteners 112 or other suitable arrangement. An electrical connector 114 connects the powered actuator 98 to an electrical power supply, and also operably interconnects the powered actuator 98 to a controller 128 (FIG. 10). Powered actuator 98 may comprise a solenoid, an electric motor, or other suitable device. A pin 108 rotatably interconnects end 110 of output 100 to lever 88, such that actuation of powered actuator 98 causes lever 88 to rotate about pin 90. As noted above, torsion spring 92 biases lever 88 in a counterclockwise direction. Powered actuator 98 may be configured to provide powered motion only when actuator 98 is retracting output member 100 to thereby overcome the torsional force generated by spring 92. Rotation in the counterclockwise direction of lever 88 may be accomplished by deactivating powered actuator 98, such that spring 92 causes lever 88 to rotate in a counterclockwise direction. Alternatively, spring 92 may be configured to provide a clockwise bias on lever 88, and actuator 98 may be configured to shift lever 88 in a counterclockwise direction when actuator 98 is actuated.

Lower end 104 of lever 88 includes a fitting 102A that interconnects lever 88 with rod 40B. Lever 88 also includes an upper end 106 having a fitting 102B that connects upper end 106 to elongated rod 40A. In use, powered actuator 98 controls rotation of lever 88 to thereby selectively pull on the rods 40A and 40B to thereby rotate latch levers 38 (FIG. 2) to release latches 25. Latch levers 38 and latches 25 operate in substantially the same manner as described above in more detail in connection with FIG. 2.

With further reference to FIG. 10, a non-moving tailgate handle 30A may be utilized in connection with the powered latch release mechanism 85 of FIG. 9. The handle 30A comprises a pocket 116 formed in rear surface 118 of a tailgate 15A. Pocket 116 may comprise an inner chassis or reinforcing structure 120 that is secured to the internal tailgate structure. The handle 30A may include a downwardly extending wall or flap 122 having an inwardly facing surface 124. An unlatch switch 126 is disposed on the inwardly facing surface 124. Switch 126 may comprise a membrane/push switch, a proximity switch, or other suitable switch/detector. In use, a user inserts his or her fingers into pocket 116, and pushes on switch 126 to thereby actuate switch 126. If switch 126 comprises a proximity switch, a user can actuate switch 126 by positioning his/her hand adjacent switch 126 to thereby generate a signal to the controller 128. Controller 128 may be configured to require actuation of switch 126 two times within a predefined time period (e.g. 1 or 2 seconds) to actuate powered actuator 98. If controller 128 is in an unlocked state, controller 128 then actuates the powered actuator 98 to thereby unlatch the latch mechanisms 25, causing the tailgate 15A to release and swing open. It will be understood that "actuation" of an actuator (e.g. actuator 98) as used herein may comprise supplying power to the actuator such that the actuator causes movement, or "actuation" may comprise cutting off power to an actuator such that an energy storage mechanism such as a spring causes movement. If the tailgate 15A does not swing open automatically (e.g. if the vehicle is parked on a hill), a user can pull outwardly on the handle 30A to open the tailgate 15A.

The controller 128 is also (optionally) operably connected to an unlatch switch or button 130 that is mounted in the vehicle interior. Although the unlatch switch 130 could be mounted in various interior locations, in a preferred embodiment unlatch switch 130 is mounted to a driver's side vehicle door 8 (FIG. 1) in a location where it is readily accessible by an operator of the vehicle 1. Controller 128 may also be operably connected to a lock/unlock switch 132 that may be mounted in the interior of the vehicle. Controller 128 may be configured such that switch 132 controls the lock state of doors 8 and the tailgate 15. For example, the lock state of doors 8 and tailgate 15 may be the same such that actuation of switch 132 to a "lock" position causes doors 8 and tailgate 15 to lock, whereas actuation of switch 132 to an "unlock" position causes doors 8 and tailgate 15 to be unlocked. Similarly, actuation of lock button 81 of key fob 80 will cause doors 8 and tailgate 15 to lock, whereas actuation of unlock button 82 will cause doors 8 and tailgate 15 to unlock. If required for a particular application, a first actuation of unlock button 82 may unlock only the driver's side door 8, and a second actuation of unlock button 82 within a predefined time period (e.g. 1 or 2 seconds) may unlock all of the doors 8 and tailgate 15. The locked or unlocked state is stored in the memory of controller 128. In the event the membrane switch 126 is pushed when the tailgate is in a locked state, controller 128 will not cause powered actuator 98 to actuate and unlatch latches 25. If an operator pushes the button 130 (or button 82 on key fob 80) to thereby change the controller 128 to an unlocked state, controller 128 will cause actuator 98 to release latches 25 if a user actuates the membrane switch 126.

Thus, the tailgate 15 can be locked and unlocked utilizing a switch or switches 132 in the vehicle interior or buttons 81 and 82 on key fob 80. When the mechanism 85 (FIG. 9) and handle 30A (FIG. 10) are utilized in tailgate 15, the tailgate 15 can be unlatched (opened) by: 1) actuating unlatch switch or button 83 of fob 80; 2) actuating switch 126 of handle 30A; or 3) actuating unlatch switch 130 in the vehicle interior. However, depending upon the requirements of a particular application, any possible combination of switches 83, 126 and 130 may also be utilized to unlatch tailgate 15.

Figure 11:
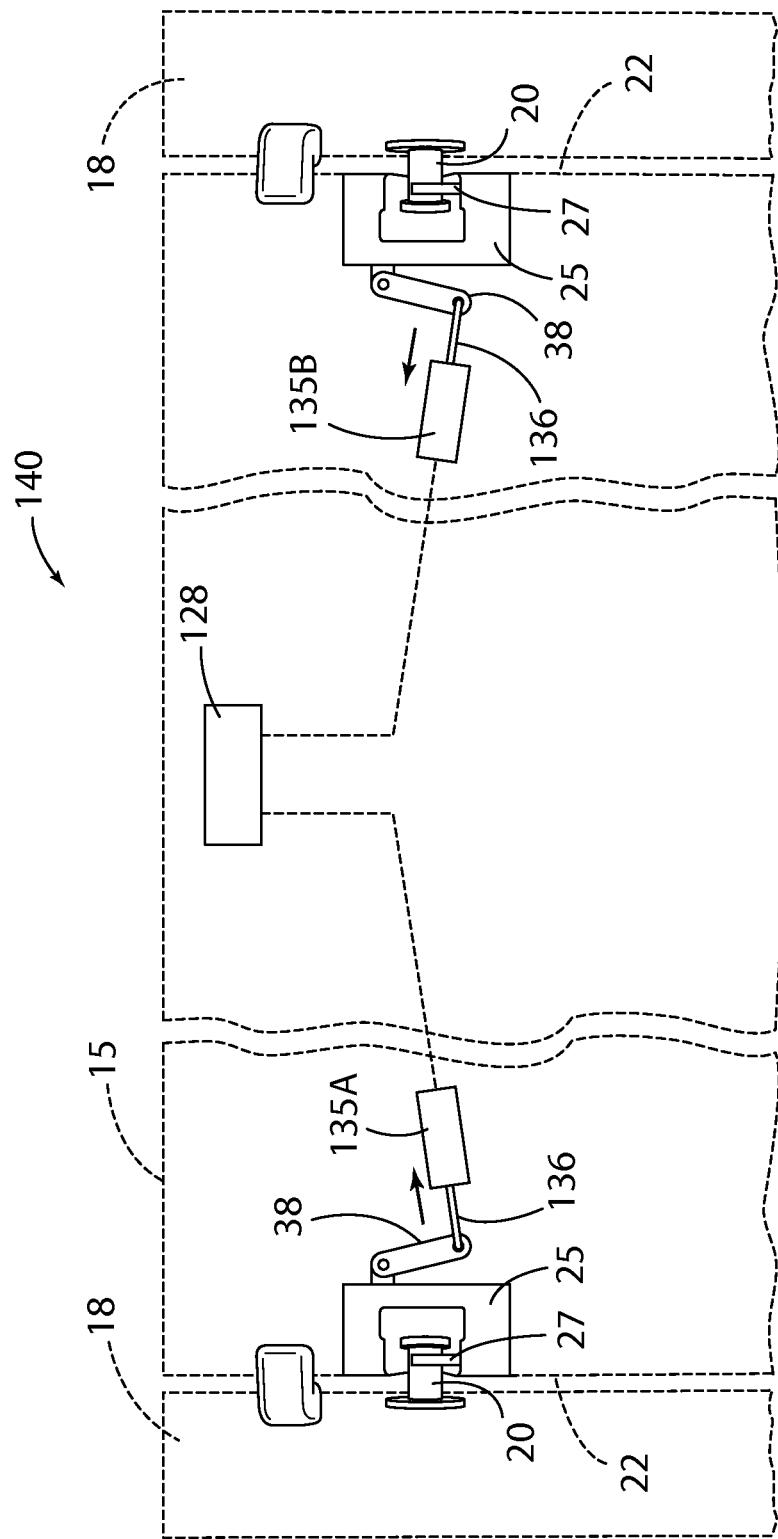
FIG. 11 is an enlarged view of a tailgate and power latch release according to another aspect of the present invention.

With further reference to FIG. 11, a powered tailgate latch release system 140 according to another aspect of the present invention includes first and second powered actuators 135A and 135B that are operably interconnected with latch levers 38 by linear output members 136. The powered actuators 135A and 135B may comprise solenoids, electric motors with gear drives or other suitable electrically powered mechanism. The powered actuators 135A and 135B are operably interconnected with the latch levers 38 by rod members 136. Actuation of the powered actuators 135A and 135B causes the rods 136 to shift linearly, thereby rotating latch levers 38 to selectively latch and unlatch the latches 25.

The powered actuators 135A and 135B are operably connected to a controller 128 (FIG. 10). Powered latch release 140 may be utilized in conjunction with a non-moving handle 30A as described in more detail above in connection with FIG. 10. The locked and unlocked states of the powered latch release system 140 may be stored in the memory of controller 128, and switches 130 and 132 in the vehicle interior compartment can be used to unlatch the tailgate 15 by selectively actuating the actuators 135A and 135B, and to switch between the locked and unlocked states. Similarly, pushbuttons on a remote key fob 80 (FIG. 3) may also be utilized to switch between the locked and unlocked states and to unlatch the latches 25 (FIG. 11). Controller 128 may be configured to actuate the powered actuator 135A and 135B upon actuation of membrane switch 126 only if controller 128 is an unlocked state.

Figure 12:
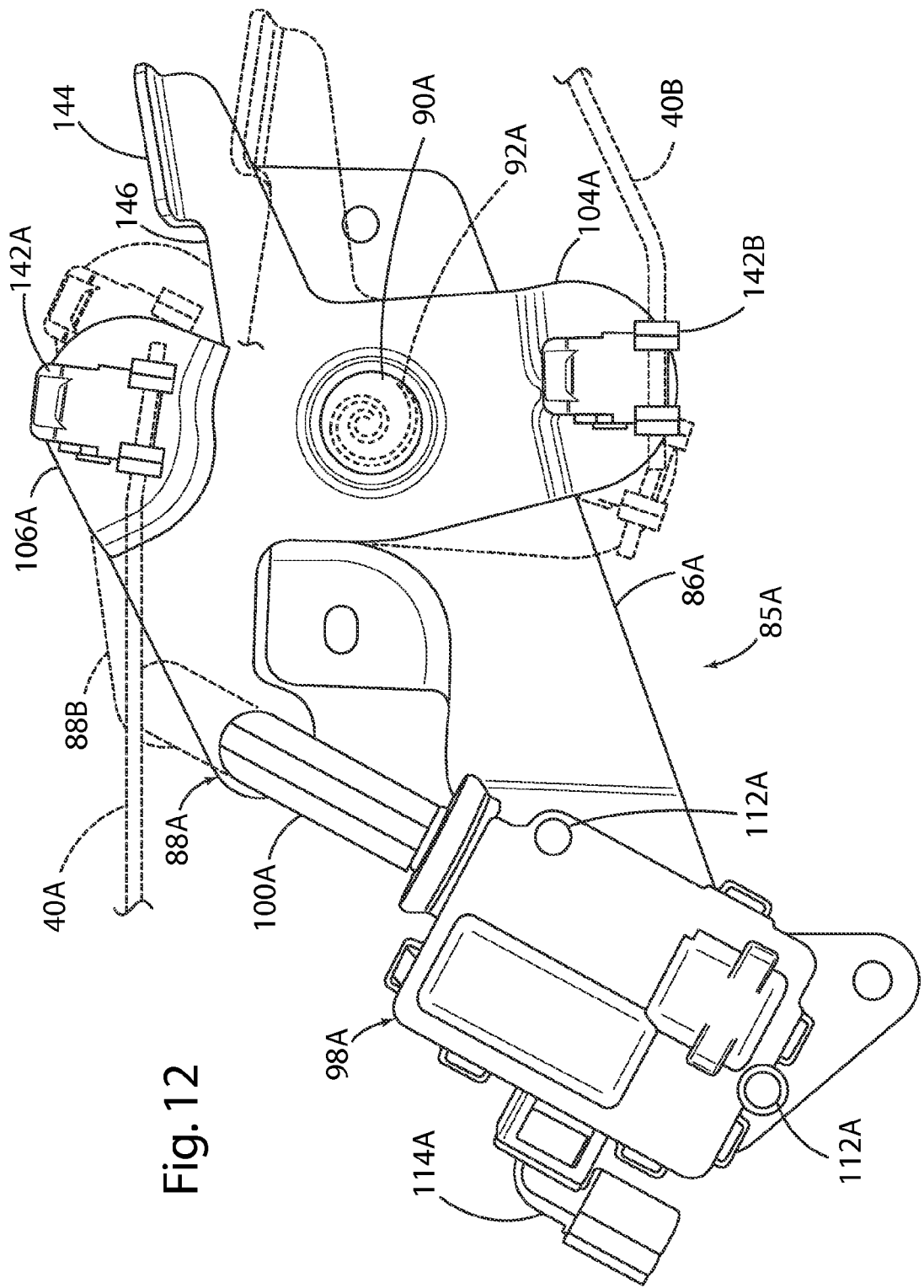
FIG. 12 is an isometric view of a powered latch release mechanism according to another aspect of the present invention.
Figure 13:
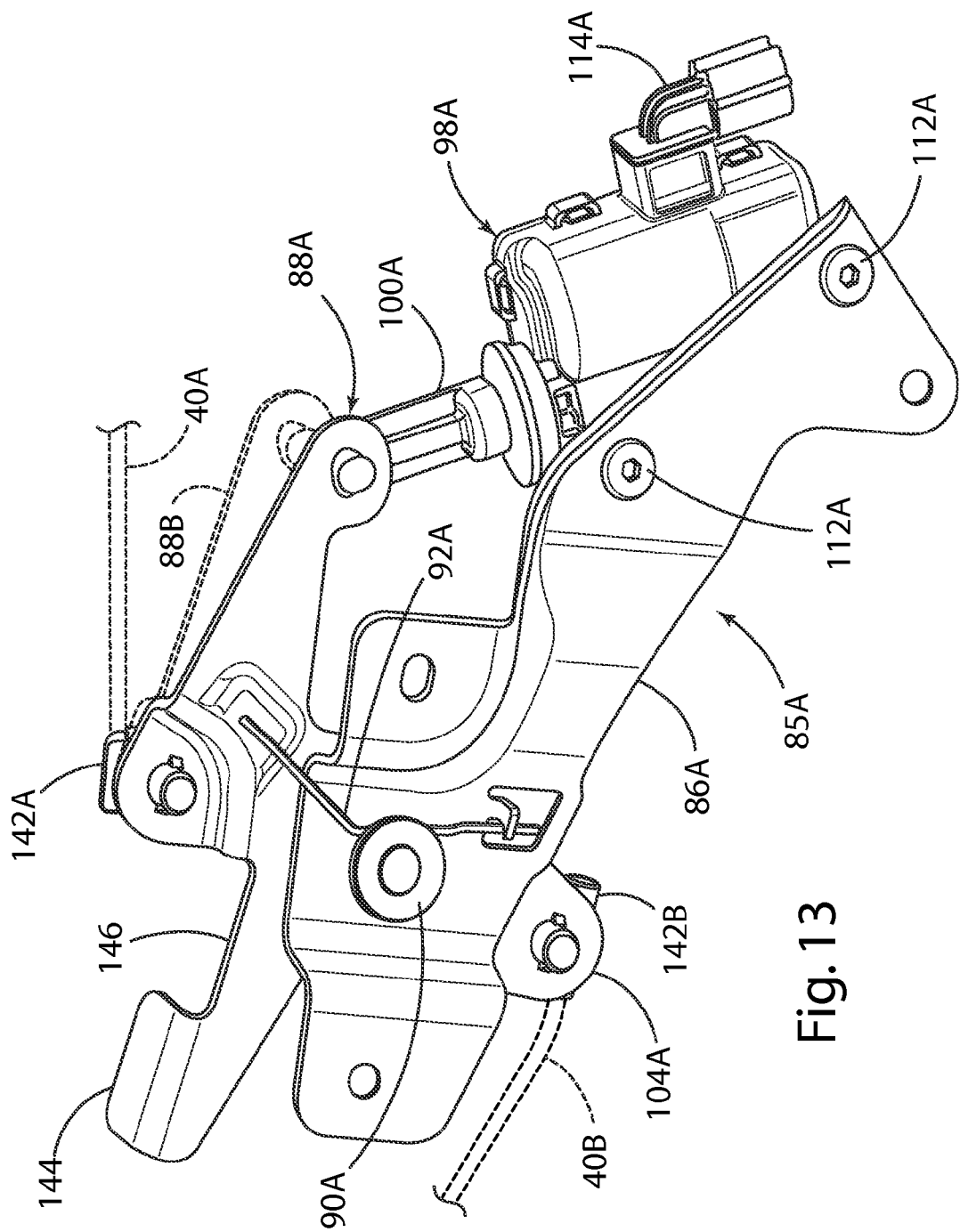
FIG. 13 is an isometric view of the powered latch release mechanism of FIG. 12.

With further reference to FIG. 12, a powered latch release mechanism 85A according to another aspect of the present invention is similar to the mechanism 85 of FIG. 9. The mechanism 85A may be utilized with a handle 30A (FIG. 10), and the operation of mechanism 85A is substantially similar to the operation of mechanism 85.

The mechanism 85A includes a powered actuator 98A having a linearly movable output member 100A that selectively rotates lever 88A to thereby shift elongated members 40A and 40B to unlatch the latch mechanisms 25. Latch mechanism 85A includes a torsion spring 92A that biases lever 88A in a counterclockwise direction. Actuation of actuator 98A causes output member 100A to overcome the bias of spring 92A to thereby rotate the lever 88A in a clockwise direction. It will be understood that the spring 92A may be configured to provide a clockwise bias on lever 88A, and powered actuator 98A may pull on lever 88A to rotate the lever 88A. Also, spring 92A may comprise a linear spring (not shown) that acts on output member 100A of actuator 98A. Fittings 142A and 142B connect rods 40A and 40B, respectively, to the upper and lower arms 106A and 104A, respectively of lever 88A. Threaded fasteners 112A or the like may be utilized to secure the powered actuator 98A to the bracket or base structure 86A of mechanism 85A. An electrical connector 114A connects the powered actuator 98A to controller 128 (FIG. 10) and to the vehicle's electrical power supply. Lever 88A may be rotatably mounted to the bracket or base structure 86A by a pin or boss 90A. Lever 88A may include an arm 146 and flange 144. During assembly of tailgate 15, the flange 144 and arm 146 may be utilized to manually shift rods 40A and 40B to latch and unlatch the latch mechanisms 25. However, when the tailgate 15 is fully assembled, the mechanism 85A is generally disposed completely within the interior of tailgate 15, such that the flange 144 cannot be accessed from outside the tailgate 15.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A tailgate for a pickup truck, comprising:
a tailgate structure configured to be movably mounted to a pickup truck;
first and second latches adapted to retain the tailgate structure in a closed position when the first and second latches are latched;
at least one powered actuator operably connected to the first and second latches to selectively unlatch the latches to permit opening of the tailgate.

2. The tailgate of claim 1, including:
at least one resilient member that is adapted to bias the tailgate towards the open position when the tailgate is in the closed position and the latches are latched, whereby the tailgate automatically shifts from its upright closed position to its open position upon actuation of the powered actuator.

3. The tailgate of claim 1, wherein:
the powered actuator is mounted to a central portion of the tailgate, and wherein the powered actuator is operably connected to the first and second latches by at least one elongated connecting member.

4. The tailgate of claim 3, wherein:
the one elongated connecting member comprises first and second elongated connecting members operably interconnecting the first and second latches, respectively, to the powered actuator; and including:
a pivotable lever operably interconnecting the powered actuator to the first and second elongated connecting members.

5. The tailgate of claim 4, including:
a handle movably mounted to the tailgate, and wherein the handle is operably connected to the first and second latches whereby movement of the handle shifts the first and second elongated connecting members and releases the first and second latches.

6. The tailgate of claim 5, wherein:
the powered actuator is operably connected to the first and second latches whereby the powered actuator shifts the first and second elongated connecting members and releases the first and second latches without movement of the handle.

7. The tailgate of claim 6, including:
first and second strikers adapted to be rigidly mounted to a vehicle structure adjacent a rear box opening;
the first and second latches include first and second latch members, respectively, that are adapted to engage the strikers to retain the tailgate in its closed position; and wherein:
the resilient member comprises first and second resilient members mounted to the tailgate adjacent the first and second latch members, respectively, and wherein the first and second resilient members are adapted to contact the first and second strikers, respectively, when the tailgate is closed.

8. The tailgate of claim 1, wherein:
the one powered actuator comprises a first powered actuator connected to the first latch and a second powered actuator connected to the second latch.

9. The tailgate of claim 1, including;
a damper mechanism adapted to generate a force tending to slow movement of the tailgate from its closed position to its open position.

10. A tailgate assembly, comprising:
horizontally spaced apart first and second strikers;
a tailgate having latches, the latches including movable latch members adapted to releasably engage the strikers;
a powered actuator operably interconnected with the latches;
a portable fob that generates a signal that remotely actuates the actuator;
resilient members that push the tailgate open automatically upon release of the latches by the powered actuator.

11. The tailgate assembly of claim 10, wherein:
the tailgate includes a tailgate structure defining a generally quadrilateral perimeter with opposite side edges defining openings therein, and upper and lower edges extending between the opposite side edges, and wherein the latch members are mounted to the tailgate structure in the openings at the opposite side edges, and wherein the resilient members are mounted within the openings adjacent the latch members whereby the latch members retain the strikers in tight engagement with the resilient members.

12. The tailgate assembly of claim 11, including:
a release lever pivotably mounted to the tailgate structure for rotation about an axis;
first and second elongated members operably interconnecting the release lever to the latches whereby movement of the handle or actuation of the powered actuator rotates the release lever and shifts the first and second elongated members to selectively unlatch the latches whereby the latch members can be shifted from engaged positions to disengaged positions as the tailgate opens.

13. The tailgate assembly of claim 10, including:
a receiver operably connected to the powered actuator, wherein the receiver is configured to generate a signal that actuates the powered actuator if the receiver receives a signal from a portable key fob.

14. The tailgate assembly of claim 10, including:
a latch control switch mounted to the tailgate whereby actuation of the latch control switch actuates the powered actuator and releases the latches.

15. The tailgate assembly of claim 14, including:
a controller configured to store a lock state of the tailgate, wherein the controller does not actuate the powered actuator when the latch control switch is actuated if the tailgate is in a locked state.

16. The tailgate assembly of claim 15, including:
a wireless remote signaling device having at least one user input feature that enables a user to change the lock state of the controller.

17. The tailgate assembly of claim 16, wherein:
the wireless remote signaling device includes at least one user input feature that enables a user to actuate the powered actuator with actuating the latch control switch.

18. The tailgate assembly of claim 10, including:
a manual release lever movably mounted to the tailgate, wherein the manual release member is mechanically connected to the latches such that movement of the manual release member unlatches the latches.

19. The tailgate assembly of claim 18, including:
a powered lock actuator that selectively disconnects the manual release lever from the latches such that movement of the manual release lever does not unlatch the latches when the manual release lever is disconnected from the latches.

20. The tailgate assembly of claim 19, including:
a wireless remote signaling device having user input features that enable a user to control the powered lock actuator to lock and unlock the tailgate by disconnecting and connecting, respectively, the manual release lever from the latches.

* * * * *